GOLD-ISOQUINOLINE-YOHIMBINE COMPLEX FOR RHEUMATIC DISEASES

Johann Heinrich Schaeppi, Mitlodi, Switzerland, assignor to Dr. Schaeppi, Aktiengesellschaft, Mitlodi, Switzerland, a corporation of Switzerland
No Drawing. Filed Dec. 22, 1959, Ser. No. 861,176
6 Claims. (Cl. 167—65)

This invention relates to a new drug for the treatment of rheumatic diseases, and to means for producing it. It is directed specifically to a new drug prepared by reacting a soluble gold salt with isoquinoline and yohimbine to obtain a complex in which gold is dissolved in extremely small, catalytic quantities.

The treatment of rheumatic and arthritic disorders has engaged the attention of physicians and other researchers for centuries. In the last decade several new remedies have been developed, all of which have shown some utility, but with attendant disadvantages which have sharply limited their value. One group, the butazolids, are effective in many cases but produce rather bad side effects. Another family of drugs, the cortisone group, give deceptively fast relief in many cases, but they require continuous dosage to keep the disease under control which often leads to a disturbance of the hormone balance in the patient, often with serious secondary results.

The incidence of such side effects is much lower when patients are treated with solubilized gold, in the form of gold salts. The known gold compounds, however, have several drawbacks. They utilize fairly large quantities of gold. Since gold becomes involved with protein in the body, and is largely not removed in normal metabolic processes, prolonged therapy with such gold compounds sometimes causes undesirable accumulation of gold in the system. Furthermore, gold therapy has not in general been as effective as could be desired.

The surprising discovery has now been made that, when an aqueous solution of a gold salt is treated with an aqueous acid solution containing a mixture of about 1 mol of isoquinoline and 2 mols of yohimbine, most of the gold precipitates, but there is left in solution a water-soluble complex containing less than 0.1% gold, and this complex is not only considerably more effective than heretofore known gold complexes in the treatment of rheumatic diseases, but also is substantially without side effects on the patients and permits much more prolonged treatment without undesirable accumulation of gold in the system.

In producing the drug, there is used a mixture of isoquinoline and yohimbine in a molar ratio of about 1 to 2.0, preferably in hydrochloric acid solution at a pH between about 2.5 and 3.5, and in low concentration (about 1% yohimbine); dilute gold salt solution, e.g., auric chloride up to about 1%, is added to the boiling solution, using from about 0.5%–1% gold based on the isoquinoline plus yohimbine. Boiling is continued until precipitation of gold monoxide is complete and the solution filtered. The filtrate now contains an isoquinoline-gold-yohimbine complex with under about .075% to 0.1% gold, dry weight, in rather dilute solution. The pH of the solution and its concentration is adjusted for the desired end use, as desired.

Preferably, the product is made up to a concentration of from .0002% to .00025% gold and is adjusted to pH 3.9 to 4.0 with formic acid, to produce a solution which can be injected as needed into the patient. About 2 to 6 milliliters may be used from 1 to 3 times a week to give effective control of rheumatic and arthritic conditions in most cases.

The use of the isoquinoline and yohimbine in the indicated approximate ratio insures the production of a complex with these very small quantities of gold, apparently producing an inner complex of gold-isoquinoline, in a very large quantity of isoquinoline-yohimbine complex. Despite the very small quantities of gold present, the effect in treatment is most marked. Indications are that despite these extremely low concentrations, the gold is in such a state in the complex that it effectively stimulates the mesenchymal tissues with resultant improvement in the connective processes where rheumatic and arthritic changes have occurred.

The following method may be used for preparing the product of this invention and is given merely by way of example.

EXAMPLE

Preparation of Complex 2 grams of pure isoquinoline $C_9H_7N$ (mol weight 130) and 13 grams of yohimbine hydrochloride

(approximate molar ratio 1 to 2.0) were dissolved in 1200 ml. of distilled water, HCl added to pH 3.0, and the mixture heated to its boiling point. In successive small portions, 15 ml. of a 0.5% auric chloride solution were added while continuing to maintain the solution at the boiling point. Heating was continued for 20 minutes and as it progressed a precipitate formed, which represented most of the gold in the form of the monoxide. The solution was then filtered, and the reddish-yellow filtrate was diluted to a solids content of 0.25%–0.3%. The pH was adjusted to 3.9–4.0 with 25% formic acid (about 1 ml. to the approximately 6 liters of solution) and the resultant solution was ampuled with 2 and 3 ml. ampules and the ampules sterilized.

On drying of some of the solution and elemental analysis, the gold content of the solids was found to be .08%. The following structural formula seems indicated:

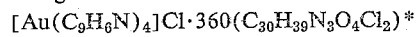

\* I.e., the product seems to be a gold isoquinoline inner complex dissolved in a large excess of isoquinoline-yohimbine complex.

The product had no definite melting point; it began to sinter at 230° C. and began to decompose at 240° C., the boiling point of isoquinoline.

Clinical Data

The product of the example was widely tested clinically. In one series of cases, a group of patients was tested including cases of chronic polyarthritis, spondylitic arthritis and general arthroses. In all cases observations were made over a four week period in the clinic and in most cases over a six month ambulatory period.

Patients whose arthritis had been under cortisone control were first taken off cortisone, and for three days were given two ampules (6 cc.) of the preparation intramuscularly and, where indicated, locally adjacent the arthritic joint; local injections were given to about one-third of the patients. For another five days, one ampule per day was used, following which the injections were reduced to one ampule three days per week for a period of two weeks. Thereafter the patients were observed as ambulatory patients. Some required no further treatment; others required further treatment at semi-weekly intervals.

The following table indicates the results obtained:

|  | Diagnosis | | |
| --- | --- | --- | --- |
|  | Chronic Poly-arthritis | Various Arthroses | Spondy-litic Arthritis |
| Number of cases | 21 | 23 | 10 |
| Excellent Results | 7 | 5 | 2 |
| Good Results | 7 | 10 | 6 |
| Fair Results | 2 | 2 | 1 |
| No Improvement | 5 | 6 | 1 |

Good to excellent results were generally obtained in about two-thirds to three-quarters of the cases, no results in from 10% to 20% of the cases, and fair results in the balance. In no case has any bad side effect been observed. An occasional nausea due to sensitivity to injections was noted in a few cases. Otherwise, the clinical data indicates an unusual freedom from difficulty even where the treatment is continuous over a long period.

The product has been used in the preferred form described in the example, in combination with novocaine or other local anesthetics, and the specific form may be varied widely without departing from the scope of the invention as defined in the claims.

What is claimed is:

1. The method of making an injectable preparation for the treatment of rheumatic diseases which comprises heating an aqueous solution of about 0.2% of isoquinoline and about 1% of yohimbine, at a pH of 2.5 to 3.5, to the boil, adding slowly to the boiling mixture a solution of auric chloride containing up to 1% auric chloride and containing an amount of gold chloride from about 0.5% to 1% of the weight of the isoquinoline plus yohimbine, continuing the heating until the precipitation of insoluble gold monoxide is complete, filtering the solution from the precipitated gold monoxide, diluting the filtrate to a gold content of .0002 to .00025% gold and adjusting its pH to 3.9 to 4.0, and ampuling the resultant solution.

2. The method of making an injectable liquid preparation for the treatment of rheumatic diseases which comprises heating a dilute aqueous acidic solution of isoquinoline and yohimbine having a molar ratio of isoquinoline to yohimbine of about 1 to 2, adding a dilute gold salt solution to the heated solution in sufficient amount to provide a reaction mixture containing from about 0.5% to 1% gold based on the isoquinoline plus yohimbine, precipitating gold monoxide from the reaction mixture and removing the precipitated gold, leaving the liquid preparation, consisting essentially of an aqueous solution of a complex of gold, isoquinoline and yohimbine, the gold comprising 0.075% to 0.1% of the complex.

3. A composition for treating rheumatic diseases comprising the injectable preparation made by the method defined in claim 2.

4. The method as defined in claim 2, including the steps of making up the liquid preparation with said complex comprising about 0.25% to 0.3% of the preparation, and adjusting the pH thereof within the range of 3.9 to 4.0.

5. A liquid composition for treating rheumatic diseases comprising the injectable preparation made by the method defined in claim 4.

6. The method of treating rheumatic diseases which comprises injecting into the patient from 2 to 6 milliliters of the preparation of claim 5 once a week to once a day until relief is obtained.

References Cited in the file of this patent

Hersperger: Annals Internal Medicine, 36:2, pages 571–581, February 1952.

Science News Letter, February 21, 1959, page 119.

"Chemotherapy of Rheumatoid Arthritis With Aralen," a publication of Winthrop Laboratories, New York 18, copyright 1957, 8 pages.